United States Patent [19]

Mann et al.

[11] Patent Number: 5,044,598

[45] Date of Patent: Sep. 3, 1991

[54] RESILIENT MOTOR MOUNTING STRUCTURE

[75] Inventors: David W. Mann, Akron; Bruce J. Senecal, Munroe Falls, both of Ohio

[73] Assignee: Karman Rubber, Akron, Ohio

[21] Appl. No.: 399,708

[22] Filed: Aug. 28, 1989

[51] Int. Cl.⁵ .......................................... F16M 11/00
[52] U.S. Cl. .................................... 248/638; 248/635; 267/141; 267/153; 267/292
[58] Field of Search ............... 248/638, 635, 634, 632; 267/141, 153, 292

[56] References Cited

U.S. PATENT DOCUMENTS

| | | | |
|---|---|---|---|
| 1,727,609 | 9/1929 | Kramer | 267/141 X |
| 2,893,722 | 7/1959 | Beck | 267/153 |
| 2,958,526 | 11/1960 | Ulderup et al. | 267/292 |
| 3,007,692 | 11/1961 | Kniffin | 267/141 X |
| 3,128,999 | 4/1964 | Schmitt | 267/153 |
| 3,250,565 | 5/1966 | Jaskowiak | 267/141 X |
| 3,677,535 | 7/1972 | Beck | 267/153 X |
| 4,033,533 | 7/1977 | Evrard | 248/632 |
| 4,286,777 | 9/1981 | Brown | 248/635 X |
| 4,306,708 | 12/1931 | Gassaway et al. | 248/635 X |

Primary Examiner—David M. Purol
Attorney, Agent, or Firm—Oldham & Oldham Co.

[57] ABSTRACT

A resilient motor mount suitable for use as a vibrational insulating motor mount. The mount connects a motor to a support structure by using a support fixture and a motor stud separated by a flexible member. A plurality of portions of the flexible member surround the support fixture and motor stud to lessen vibrational transfer from the motor to the structure fixture and to lessen metal fatigue caused by metal to metal contact.

8 Claims, 3 Drawing Sheets

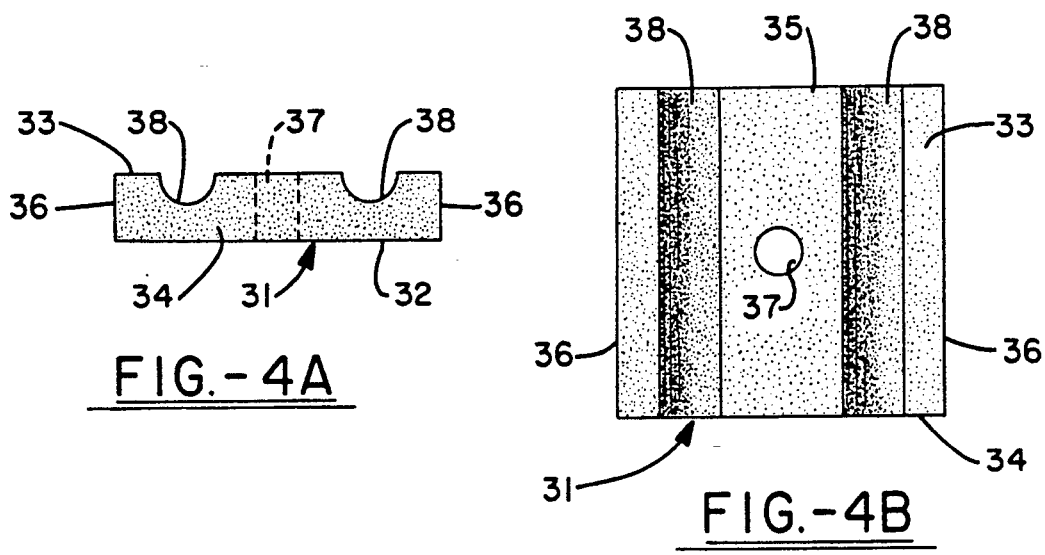
FIG.-4A
FIG.-4B
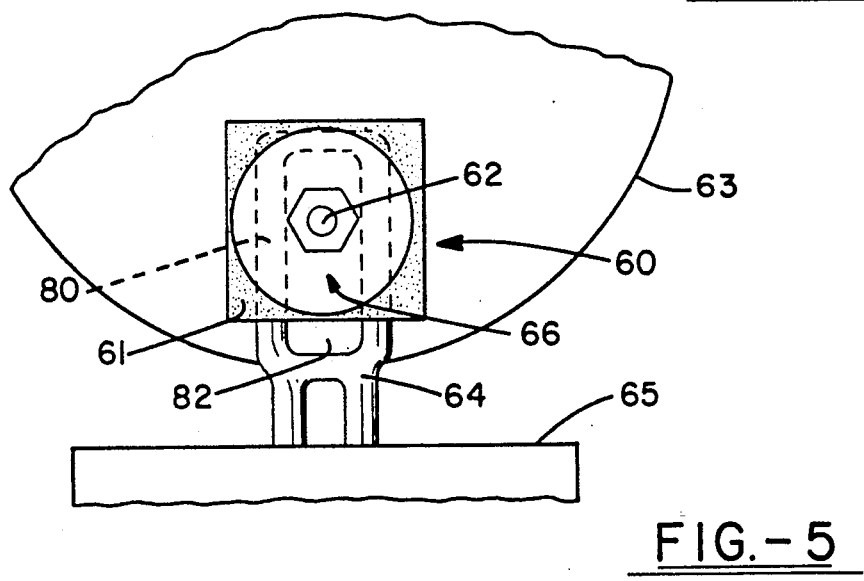
FIG.-5
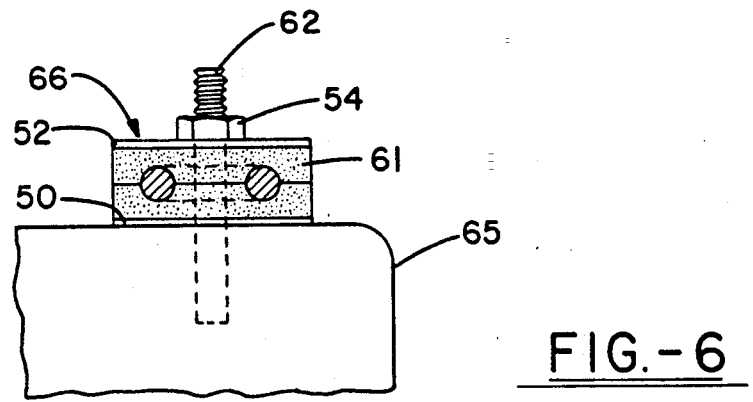
FIG.-6

RESILIENT MOTOR MOUNTING STRUCTURE

FIELD OF THE INVENTION

This invention describes an apparatus of a resilient motor mount structure which vibrationally isolates the motor end support structure and eliminates all metal to metal contact points. More particularly, the invention provides a resilient motor mount for an electric motor to eliminate problems due to vibration.

BACKGROUND

Bushing and flexible engine mounts for internal combustion engines have been used extensively to improve automobile handling. Such bushings were designed normally to isolate an engine from a chassis by creating a resilient buffer between the engine and the chassis contact points.

In recent years, new engine mounting structures have been designed to overcome vibrational problems associated with 4-cylinder engines. Brock et al., in U.S. Pat. No. 4,183,496, has disclosed a unique multiply armed flexible bushing to address 4-cylinder engine mounting.

Mounting assemblages for motors are also advantageous for similar reasons that engine mounts are desirable. Electric motors are often mounted in housing or support structures and the contact points where the motor is anchored to the support are subject to metal-metal contact wear, noise generation, and other vibrational induced problems.

Thus, it appears to be desirable to design a resilient motor mount which can vibrationally insulate electric motors from support structures and thereby eliminate vibrational problems such as metal fatigue at the contact points and support shaking and noise generation.

DESCRIPTION OF THE INVENTION

The resilient motor mount of this invention provides a means for vibrationally insulating an electric motor support structure or frame from the motor. The mount comprises an elastomeric mount interposed between a motor mounting stud and a fixture protruding from a motor support structure having a first portion encircling said stud and a second portion encircling said fixture in such as manner as to insulated the stud from the fixture from any vibrational transference and to preclude any direct stud to fixture contact and a means for clamping or securing the elastomeric member to the motor mounting stud. The exact design of the elastomeric member and the clamping means will depend in a large part on the exact nature of the motor mounting stud and the protruding fixture attached to the motor support structure.

In particular, the motor mount of the present invention can be used to vibrationally insulate an electric fan motor from support frames, normally metal grid structures which act as enclosing guards for the fan blades driven by the motor, such as electric fans used in home and industrial assemblies. Fan frames normally consist of electric motors mounted to a central region of a metal grid structure forming essentially a toroidal solid which enclose the fan blades and protect humans from accidental contacts with the fan blades during fan operation. The mountings of the motor normally consist of directly clamping a metal fixture on the grid to the mounting studs on the motor. Such direct mounting devices are often plagued with noise generation and rapid metal wear and fatigue. The protruding fixture from the motor support structure of fan grid structure can be of variety of types including, but not limited to, a plurality of substantially parallel rods or a loop with a hole in the center for the mounting stud to pass through with sufficient space around the stud to provide insulation by the elastomeric member.

The clamping means can comprise a variety of holding and/or tightening means such as a nut and washers, a cotter pin or lock clip and an eye in the stud and can be made of any appropriate materials such as metals, composites, plastics, or other similar building materials.

The mount of the present invention is designed to eliminate the above mentioned problems and allow for wider choices as to frame mountings and fan design for homes and businesses. Such mounts can also benefit other electric motor assemblages where vibrational insulation of the electric motor from the motor support structure is desirable. The present invention would also improve fan use in situations where vibrational problems may be intolerable such as in computer technology or in mounting electric motors in surroundings subject of unusual vibrations such as automobiles, airplanes and space vehicles.

BRIEF DESCRIPTION OF THE DRAWINGS

FIG. 3b is a top view of the contents of FIG. 3a.

FIG. 4a is a side view of a second embodiment of the mount shown in FIGS. 1 and 2 where two identical mount halves make up the mount.

FIG. 4b is a top view of the contents of FIG. 4a.

FIG. 5 is a top view of a second embodiment of the resilient motor mount.

FIG. 6 is a side view of FIG. 6.

FIG. 7b is a top view of the contents of FIG. 7a.

DESCRIPTION OF PREFERRED EMBODIMENT

Figure 2:
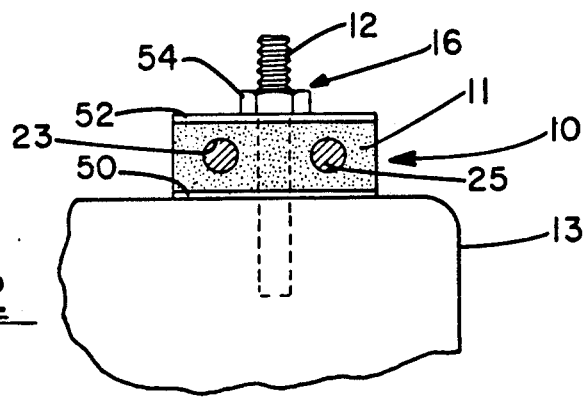
FIG. 2 is a side view of the contents of FIG. 1.
Figure 1:
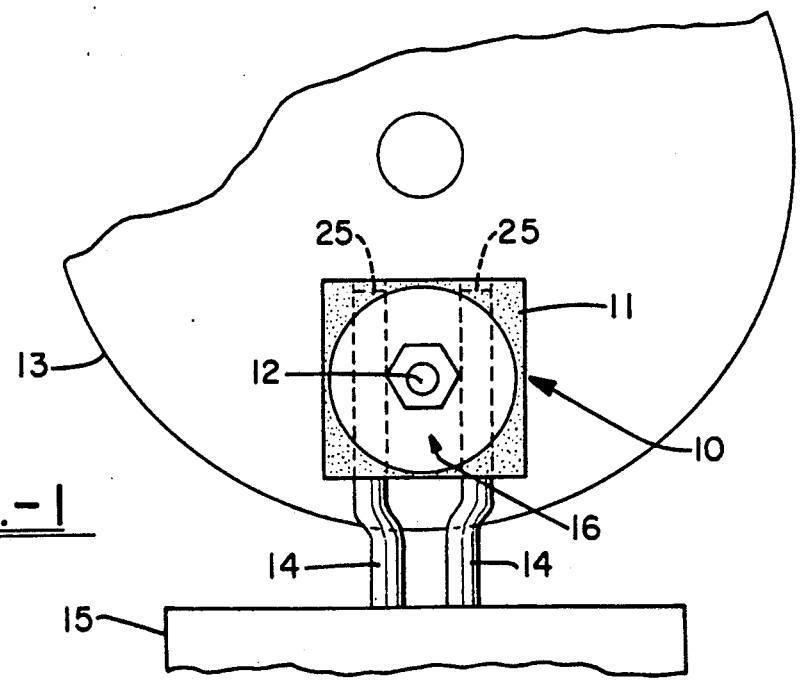
FIG. 1 is a top view of a first embodiment of the resilient motor mount.

FIGS. 1 and 2 represent a top and side view of a first embodiment of the resilient motor mount of this invention, generally 10, which comprises two main components: an elastomeric member 11 adapted to interpose between a motor mounting stud 12 protruding from a motor 13 and a fixture 14 protruding from a motor support structure 15, which fixture in this embodiment comprises a plurality of essentially parallel rods 25 which are spaced apart so as to straddle stud 12 and provide sufficient space between stud 12 and rods 25 that member 11 can prevent any direct contact between the two elements and afford sufficient vibrational insulation between stud 12 and said fixture 14; and a means for clamping or securing, generally 16, the elastomeric member 11 to stud 12 resulting in the holding of fixture 14.

Figure 3A:
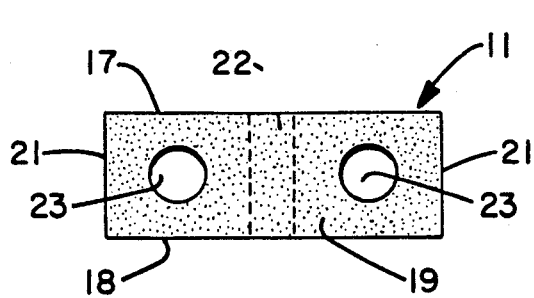
FIG. 3a is a side view of the elastomeric mount showing the portions designed to encircle the stud and fixture.
Figure 3B:
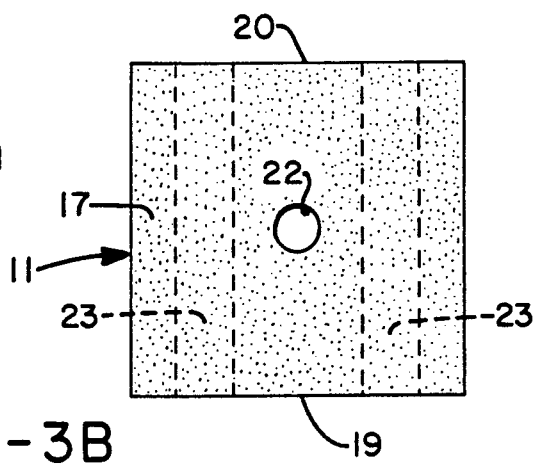

FIGS. 3a and 3b represent top and side views of a first embodiment of elastomeric member 11. FIGS. 3a and 3b depict an essentially rectangular solid having a first face 17, a second face 18, a front edge 19, a back edge 20, two side edges 21, a vertical aperture 22 extending from said first face to said second face adapted to encircle stud 12 and a plurality of lateral apertures 23 extending from said front edge to said back edge adapted to encircle rods 25.

FIGS. 4a and 4b represent top and side views of another embodiment of elastomeric member 11 above. FIGS. 4a and 4b depict one half, generally 31, of a mirror imaged pair of halves of which only one half is shown having a top face 32, a bottom face 33, a front edge 34, a rear edge 35, two side edges 36, a first portion 37 extending from said top face to said bottom face, a plurality of lateral channels 38 extending from said front edge to said back edge in said bottom face 33, said bottom faces adapted to engage one another resulting in the alignment of said halves 31 of said member such that said vertical apertures 37 of said halves 31 are adapted to encircle stud 12 and such that said channels 38 of said halves 31 are adapted to encircle rods 25.

Referring now to FIG. 2, the clamping means 16, for either embodiment of the elastomeric member 11, but described only for the first embodiment, comprises a first washer 50 interposed between the motor 13 and elastomeric member 11 and adapted to engage a first face 17 of elastomeric member 11, a second washer 52 adapted to be interposed between elastomeric member 11 and a means 54 for engaging stud 12, washer 52 firmly against a second face 18 of elastomeric member 11, by engaging stud 12, said clamping means can be any standard clamping means known in the art such as a nut, as shown here, with a threaded end of stud 12, a cotter pin with a eye in a top portion of stud 12, and clip ring with an circular indentation in the top portion of stud 12.

FIGS. 5 and 6 represent top and side views of a second embodiment of the motor mount of the present invention, generally 60, which comprises two main components: an elastomeric member 61 adapted to interpose between a motor mounting stud 62 protruding from a motor 63 and a fixture 64 protruding from a motor support structure 65 which in this embodiment comprises a looped component 80 with a slot 82 therein adapted to engage motor stud 62 by allowing said stud to pass through said slot, said slot 82 dimension generated by the looped component 80 is such that stud 62 will not contact directly the material making up component 80 when surrounded by elastomeric member 71; and a means for clamping or securing, generally 66, the elastomeric member 61 to stud 62 resulting in the holding of fixture 64.

Figure 7A:
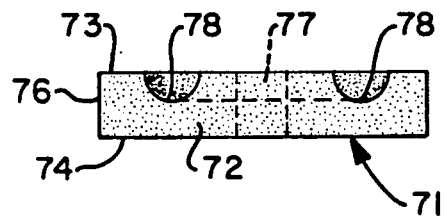
FIG. 7a is a side view of an elastomeric mount which is a halved structure requiring two mirror image halves to comprise the mount of FIGS. 5 and 6.
Figure 7B:
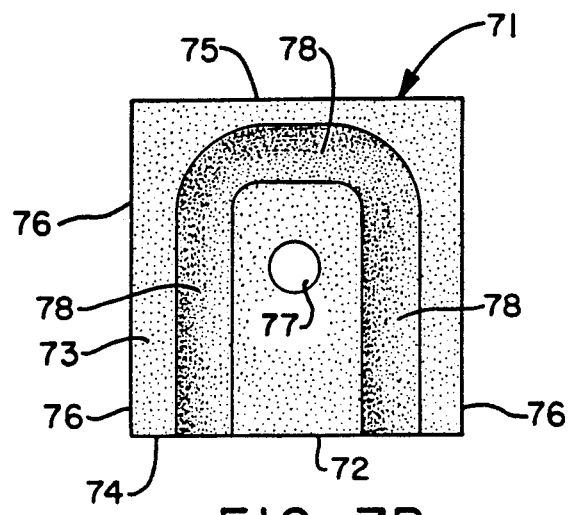

FIGS. 7a and 7b represent top and side views of another embodiment of elastomeric member 61 above. FIGS. 4a and 4b depict one half, generally 71, of a mirror imaged pair of halves of which only one half is shown having a top face 72, a bottom face 73, a front edge 74, a rear edge 75, two side edges 76, a vertical aperture 77 extending from said top face to said bottom face, starting from said front edge and not contacting said side and; back edges in said bottom face, said bottom faces adapted to engage one another resulting in the alignment of said halves 71 of said member such that said vertical aperture 77 of said halves 71 are adapted to encircle stud 62 and such that said groove 78 of said halves 71 are adapted to encircle looped component 80.

As shown in FIG. 6, the clamping means 66 is in all essential features identical to the clamping means 16 and will not be redefined here.

Figure 8:
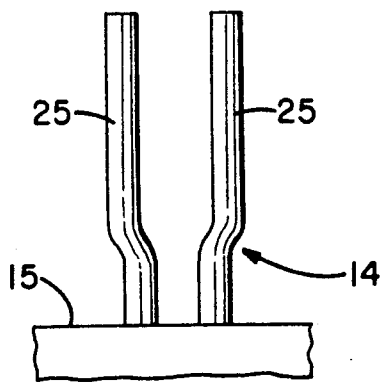
FIG. 8 is an unincumbered view of the fixture adapted to engage the motor mounting stud of FIG. 1.

FIG. 8 depicts a clearer rendition of the fixture 14 of FIGS. 1 and 2 comprising a plurality of substantially parallel rods 25 absent any other components which may have obstructed the true nature of fixture 14.

Figure 9:
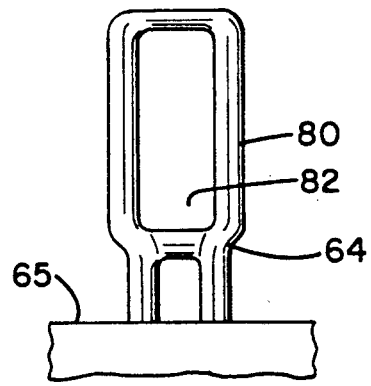
FIG. 9 is an unincumbered view of the fixture adapted to engage the motor mounting stud of FIG. 2.

FIG. 9 depicts a clearer rendition of the fixture 34 of FIGS. 5 and 6 comprising a looped component 80 and a slot 82 absent any other components which may have obstructed the true nature of fixture 64.

Of course, it will be noted that many of the above elements that have been renumbered in FIGS. 6 and 7 are similar if not identical to the analogous elements of FIGS. 1 and 2. This renumbering was done to insure clarity and definiteness.

Rods 25 and looped component 80 can be made of a variety of structural materials including but not restricted to steel, aluminum, carbon composites, plastics or other structural materials and can be formed by standard and known techniques.

The elastomeric member as embodied in any of the above embodiments can be composed of natural or synthetic rubbers compounded to withstand normal environmental conditions found in environments where fans and similar type of equipment are used. Some possible rubbers which can be used in the present invention are: Natural, SBR, EPDM, Neoprene, EPDM/butyl Blends, Halo-Butyl Blends, Silicone, PPO, and other similar materials. The rubber chosen will normally have physical properties similar to sulfur or peroxide cured rubber compounds which exhibit good damping characteristics, good oxidative stability, good ozone stability, and good stability in humid conditions. The elastomeric members can be made by a variety of known processes for manufacturing rubber articles such as pressure molding, extrusion molding, injection molding and other similar processes. Two representative and illustrative rubber compounding recipes for the rubber that goes into the manufacturing of the elastomeric member are shown below:

| 50 Durometer Natural Rubber | |
|---|---|
| Natural Rubber | 100 |
| Zinc Oxide | 5 |
| Stearic Acid | 2 |
| N660 Carbon Black | 20 |
| Naphthenic Process Oil | 2 |
| p-Phenylenediamine Antiozonant | 3 |
| Sulfenamide Accelerator | 0.6 |
| Sulfur | 2.5 |
| | 137.1 |
| 50 Durometer Neoprene | |
| Neoprene W | 100 |
| Magnesium Oxide | 4 |
| Stearic Acid | 0.5 |
| N762 Carbon Black | 50 |
| | 154.5 |

The first example is for a natural rubber formulation while the second is for a neoprene formulation.

The motor support structure fixtures can be an integral part of the support structure or may be applied subsequently by a known method of attachment including, but not limited to, welding, spot welding, riveting, or bolting or some combination thereof.

Alterations and modifications of this invention will become apparent to those skilled in the art without departing from the scope of this invention. It is understood that this invention is not limited to the embodiments herein set forth.

What is claimed is:

1. A mount for a motor, said mount including:
   a mounting stud protruding from said motor;
   a fixture protruding from a motor support structure adapted to engage said stud, said fixture comprising a plurality of rods;
   a resilient elastomeric member adapted to be interposed between said fixture and said stud and vibrationally insulate said fixture from said stud, having a first portion encircling said stud and a second portion encircling said fixture; and
   a clamping means adapted to engage said stud and thereby securing the elastomeric member in place.

2. A mount according to claim 1, wherein said elastomeric member comprises an essentially rectangular solid having rounded edges, a first face, a second face, a front edge, a back edge, and two side edges, a vertical aperture extending from said first face to said second face adapted to encircle said stud, and a plurality of lateral apertures extending from said front edge to said back edge adapted to engage said fixture.

3. A mount according to claim 1, wherein said elastomeric member comprises a first half and a second half, said first and said second halves having a top face, a bottom face, a front edge, a rear edge, two side edges, a vertical aperture extending from said top face to said bottom face, a plurality of lateral grooves extending from said front edge to said back edge in said bottom face, said bottom faces adapted to engage one another resulting in the alignment of said first and second halves of said member such that said vertical apertures of said halves are adapted to encircle said stud and such that said grooves of said halves are adapted to encircle said fixture.

4. A mount for an electric fan motor said mount including:
   a mounting stud protruding from said electric fan motor;
   a fixture protruding from said grid adapted to engage said stud, said fixture comprising a plurality of rods;
   a resilient elastomeric member adapted to be interposed between said fixture and said stud and vibrationally insulate said fixture from said stud, having a first portion encircling said fixture and a second portion encircling said stud; and
   a clamping means adapted to engage said stud and thereby securing the elastomeric member in place.

5. A mount according to claim 4, wherein said elastomeric member comprises an essentially rectangular solid having rounded edges, a first face, a second face, a front edge, a back edge, and two side edges, a vertical aperture extending from said first face to said second face adapted to encircle said stud, and a plurality of lateral apertures extending from said front edge to said back edge adapted to engage said fixture.

6. A mount according to claim 4, wherein said elastomeric member comprises a first half and a second half, said first and said second halves having a top face, a bottom face, a front edge, a rear edge, two side edges, a vertical aperture extending from said top face to said bottom face, a plurality of lateral grooves extending from said front edge to said back edge in said bottom face, said bottom faces adapted to engage one another resulting in the alignment of said first and second halves of said member such that said vertical apertures of said halves are adapted to encircle said stud and such that said grooves of said halves are adapted to encircle said fixture.

7. A mount for a motor, said mount including:
   a mounting stud protruding from said motor;
   a fixture protruding from a motor support structure adapted to engage said stud, said fixture comprising a looped member having a slot inside adapted to allow said stud to pass therethrough;
   a resilient elastomeric member adapted to be interposed between said fixture and said stud and vibrationally insulate said fixture from said stud, having a first portion encircling said stud and a second portion encircling said fixture, said elastomeric member comprising a first half and a second half, said first and said second halves having a top face, a bottom face, a front edge, a rear edge, two side edges, a vertical aperture extending from said top face to said bottom face, a U-shaped groove starting from said front edge and not contacting said side and back edges in said bottom face, said bottom faces adapted to engage one another resulting in the alignment of said first and second halves of said member such that said vertical apertures of said halves are adapted to encircle said stud and such that said grooves of said halves are adapted to encircle said fixture; and
   a clamping means adapted to engage said stud and thereby securing the elastomeric member in place.

8. A mount for an electric fan motor said mount including:
   a mounting stud protruding from said electric fan motor;
   a fixture protruding from said grid adapted to engage said stud, said fixture comprising a looped member having a slot inside adapted to allow said stud to pass therethrough;
   a resilient elastomeric member adapted to be interposed between said fixture and said stud and vibrationally insulate said fixture from said stud, having a first portion encircling said fixture and a second portion encircling said stud, said elastomeric member comprising a first half and a second half, said first and said second halves having a top face, a bottom face, a front edge, a rear edge, two side edges, a vertical aperture extending from said top face to said bottom face, a U-shaped groove starting from said front edge and not contacting said side and back edges in said bottom face, said bottom faces adapted to engage one another resulting in the alignment of said first and second halves of said member such that said vertical apertures of said halves are adapted to encircle said stud and such that said grooves of said halves are adapted to encircle said fixture; and
   a clamping means adapted to engage said stud and thereby securing the elastomeric member in place.

* * * * *